April 18, 1944.     E. R. BERGMANN     2,347,074
SHAKER CONVEYER
Filed May 20, 1943     3 Sheets-Sheet 1
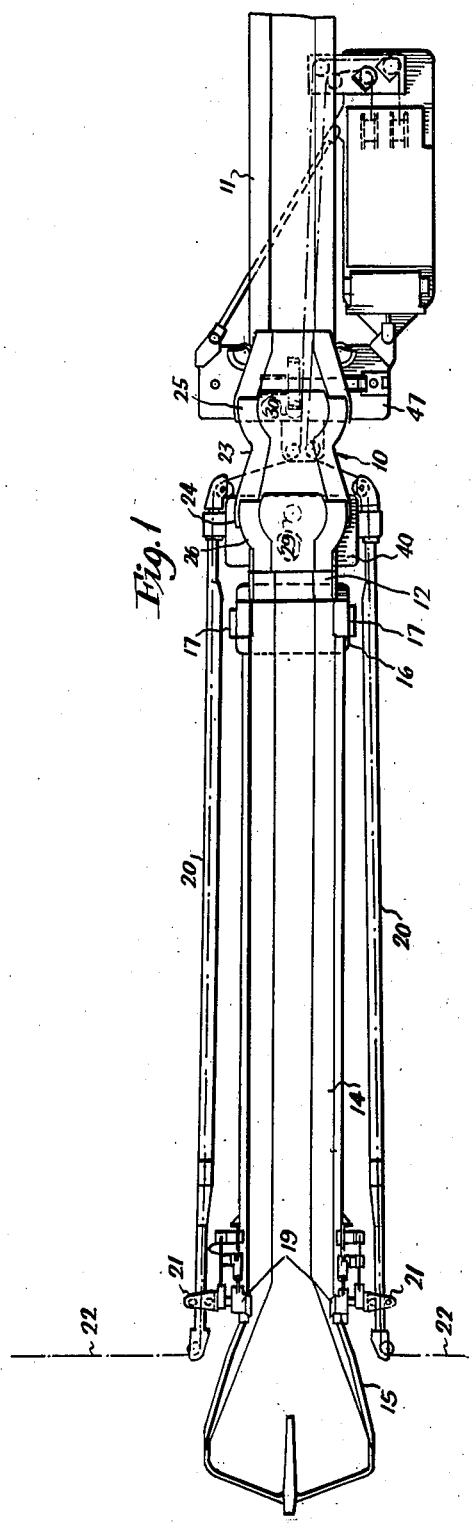
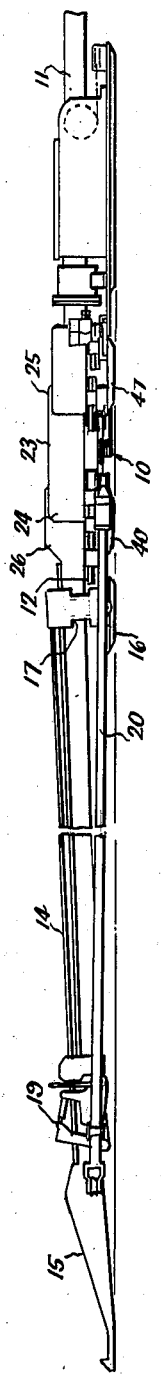
INVENTOR
Ernst R. Bergmann
Clarence F. Poole
ATTORNEY

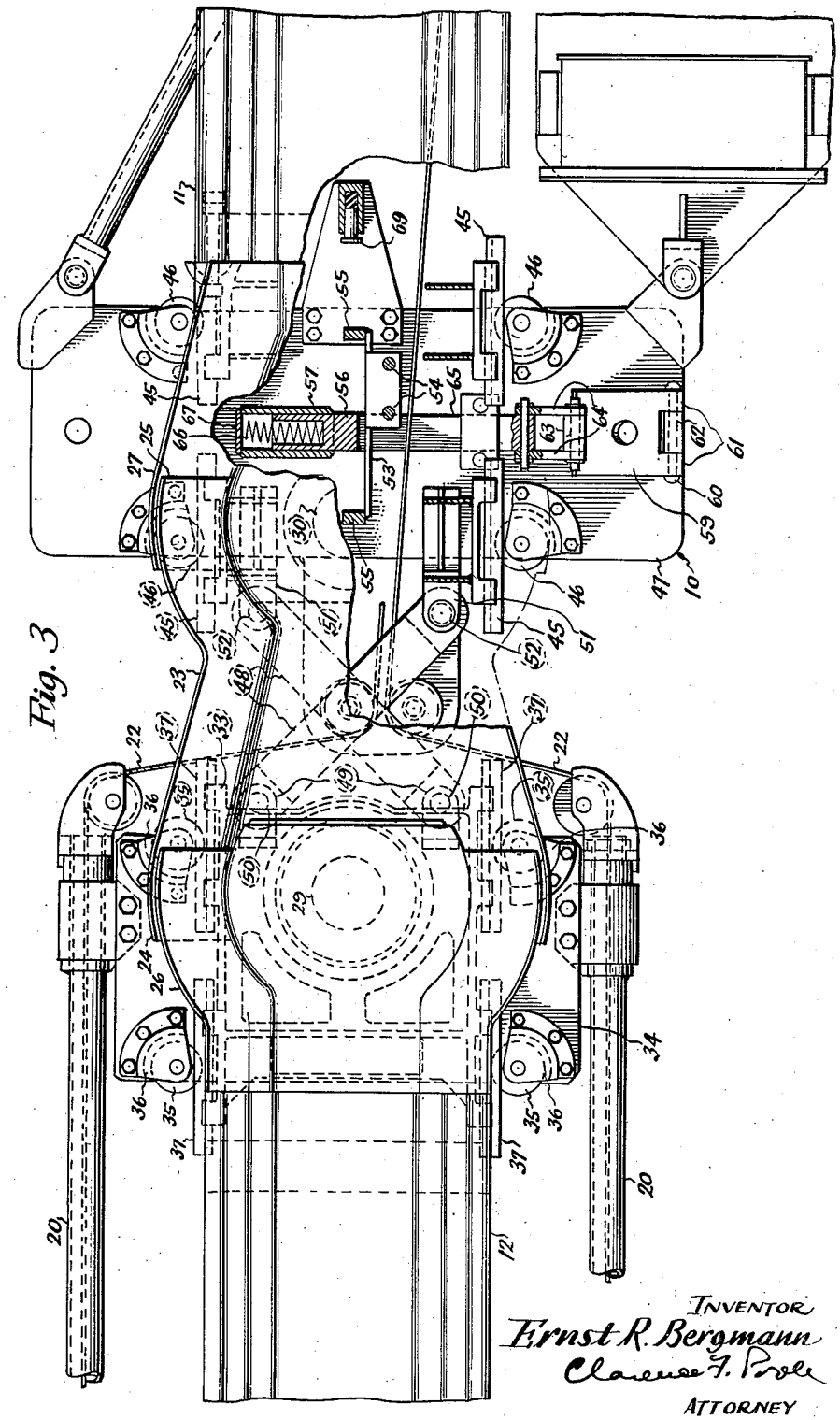

April 18, 1944.   E. R. BERGMANN   2,347,074
SHAKER CONVEYER
Filed May 20, 1943   3 Sheets-Sheet 3
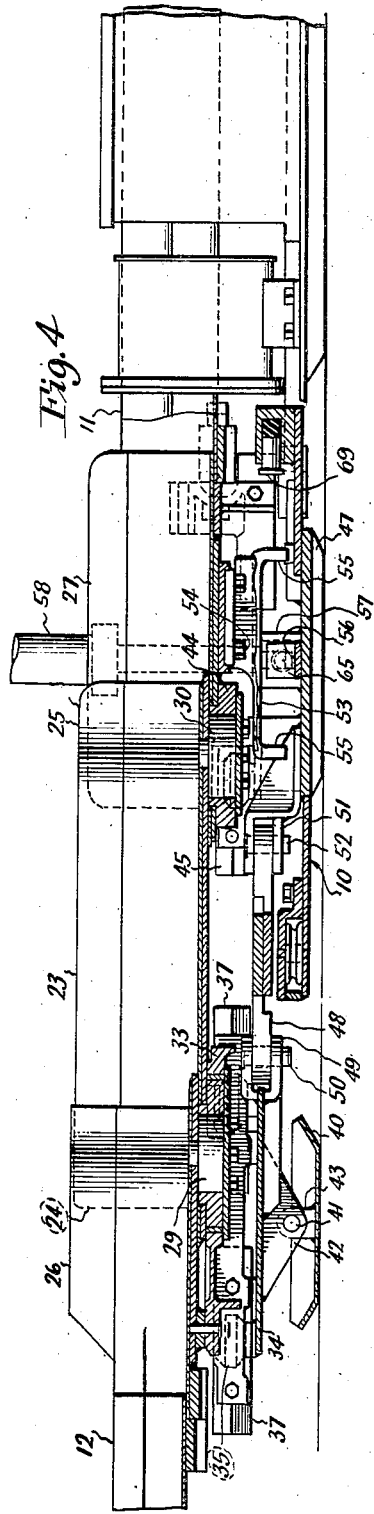
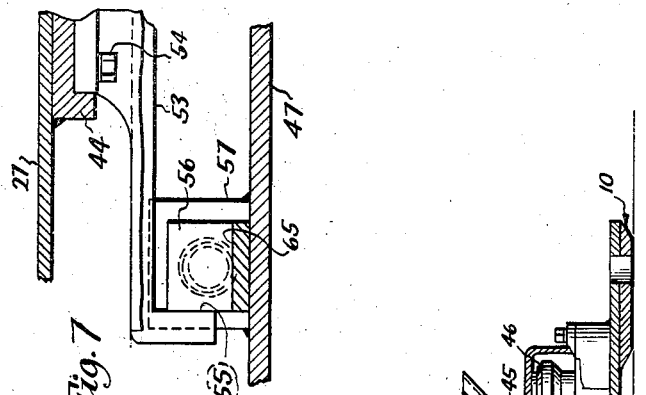
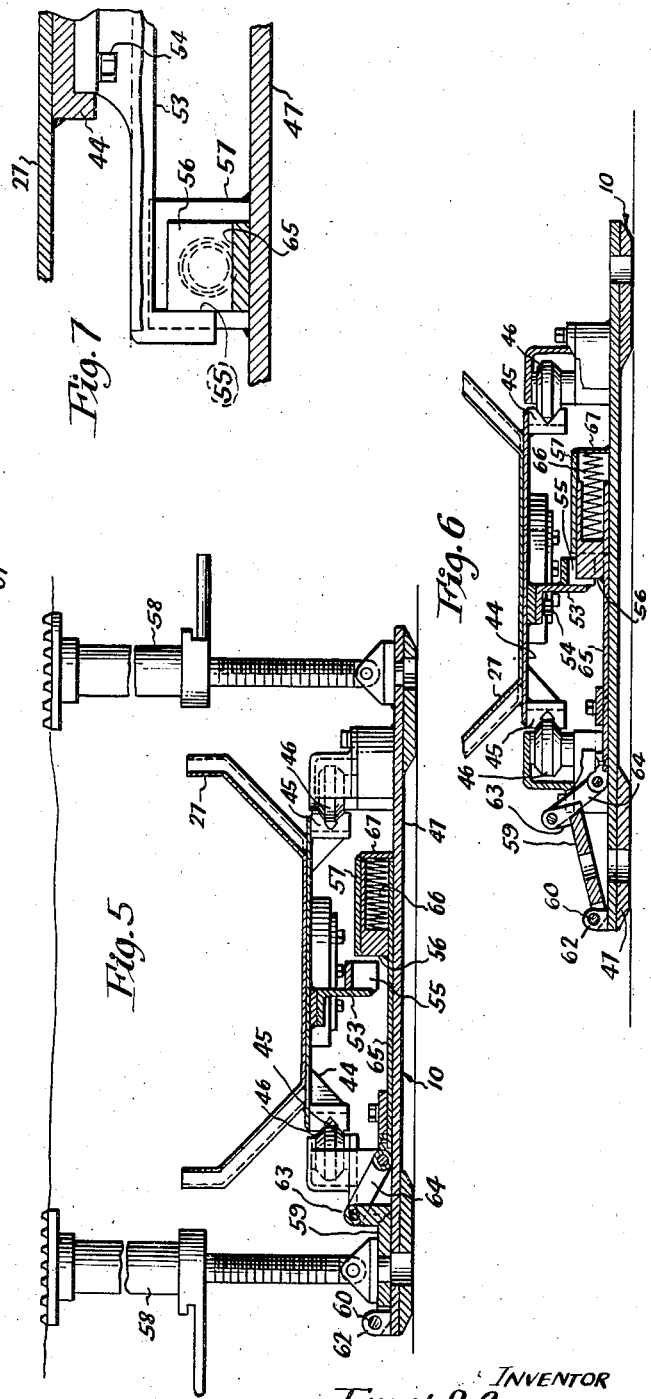
INVENTOR
Ernst R. Bergmann
Clarence F. Poole
ATTORNEY Patented Apr. 18, 1944

2,347,074

UNITED STATES PATENT OFFICE 2,347,074

SHAKER CONVEYER

Ernst R. Bergmann, Evergreen Park, Ill., assignor to Goodman Manufacturing Company, Chicago, Ill., a corporation of Illinois Application May 20, 1943, Serial No. 487,684

7 Claims. (Cl. 198—220)

This invention relates to improvements in shaker conveyers and more particularly relates to an improved form of swivel for a shaker conveyer trough line, permitting the inby end of the trough line to be swung from side to side during operation of the conveyer, for picking up loose material from the ground.

The principal objects of my invention are to provide a novel and improved form of swivel including means for centering a base upon which the swivel is mounted with respect to the stroke of the conveyer, to insure that the troughs thereon will be supported by said base during the entire stroke of the conveyer, and to provide means for automatically rendering the centering mechanism inactive as soon as the centering operation is completed and the base is secured in position on the ground.

Other objects of my invention will appear from time to time as the following specification proceeds and with reference to the accompanying drawings wherein:

Figure 1 is a plan view of the receiving end of a shaker conveyer trough line having a swivel constructed in accordance with my invention connected therein;

Figure 2 is a view in side elevation of the device shown in Figure 1;

Figure 3 is an enlarged plan view of the swivel with certain parts broken away and certain other parts shown in horizontal section in order to more clearly illustrate certain details of my invention;

Figure 4 is a view in side elevation drawn to substantially the same scale as Figure 3, with certain parts of the swivel shown in longitudinal section;

Figure 5 is a transverse sectional view taken through the centering mechanism for the swivel base, showing the base for the swivel secured in position on the ground and showing the centering mechanism in an inoperative position;

Figure 6 is a transverse sectional view taken through the centering mechanism for the swivel base, showing the base free to move along the ground into a centered position and showing the centering mechanism in an operative position; and Figure 7 is a partial fragmentary detail longitudinal sectional view showing certain details of one of the stops for the centering mechanism.

In the drawings a swivel 10 is shown as being connected to a trough 11 of a shaker conveyer trough line at one of its ends and to a reciprocating trough 12 at its opposite end, which has its discharge end spaced forwardly of the receiving end of said trough 11 and is connected to said swivel for lateral swinging movement along the ground with respect to said trough 11.

The reciprocating trough 12, as herein shown, is slidably mounted at its forward end on an extensible trough 14 which is slidably supported on the ground at its forward end on a pick-up member or shovel 15 communicating therewith. The rear end of said extensible trough is supported on the ground on a shoe 16, by means of a pair of parallel spaced supporting legs 17, 17, transversely pivoted to said shoe at their lower ends and secured to opposite outer sides of said trough at their upper ends in a manner not herein shown or described since it forms no part of my present invention. A suitable friction grip feeding mechanism 19 is shown as being provided for extending said extensible trough from or retracting it with respect to said reciprocating trough. Said feeding mechanism may be of any well known form and is no part of my present invention, so will not herein be shown or described in detail.

A pair of parallel spaced arms 20, 20 are connected to said swivel at their rear ends and are supported at their forward ends on brackets 21, 21, projecting laterally from said feeding mechanism. Said arms are each adapted to have a flexible draft device 22 trained therethrough and laterally from the forward ends thereof, to fixed abutments remote from said trough, for moving said reciprocating and extensible troughs laterally upon the drawing in of either of said feeding devices. The construction of said arms and their connection to said swivel and the slidable supporting connection between said feeding mechanism and said arms are no part of my present invention and are clearly shown and described in a companion application Serial No. 487,683, filed May 20, 1943, by William W. Sloane, so will not herein be shown or described in detail.

The swivel 10, as herein shown, includes a relatively short intermediate trough 23 having outwardly flared curved forward and rear ends 24 and 25, respectively. Said curved forward end has a flared curved rear end of a connecting trough 26 nested therein, which connecting trough is secured to the discharge end of the reciprocating trough 12 in a manner well known to those skilled in the art, so not herein shown or described in detail. Said curved rear end of said intermediate trough is nested within a correspondingly curved flared receiving end of a connecting trough 27. Said last mentioned connecting trough is suitably secured to the receiving end of the trough 11, which last mentioned trough is secured to and forms a part of the inby end of the shaker conveyer trough line. Said intermediate swiveled trough 23 is pivotally connected to said connecting troughs 26 and 27 by means of pivotal bearing members 29 and 30, respectively, and said intermediate trough, with said connecting troughs, forms a continuous trough from the reciprocating trough 12 to the trough 11, when said reciprocating trough is at various angular positions with respect to said trough 11, about the vertical axes of the bearing members 29 and 30.

The bearing member 29 is pivotally mounted on a transverse frame 33. Said transverse frame is reciprocably mounted at its opposite sides on a support frame 34 on a plurality of laterally and longitudinally spaced anti-friction rollers 35, 35 mounted on said support frame and having supporting engagement with said transverse frame. Said rollers have V-shaped engaging faces and are mounted between the top of said frame and support brackets 36, 36 for rotation about vertical axes, on opposite sides of said support frame 34, adjacent the forward and rear ends thereof. Longitudinally spaced V-shaped guide tracks 37, 37 are secured to opposite sides of said transverse frame 33 and project laterally therefrom and are adapted to be engaged with and supported by the V-shaped faces of the rollers 35, 35, to provide a reciprocating support for the connecting trough 26 and the rear end of the reciprocating trough 12, on said support frame. Said support frame is slidably mounted on the ground on a shoe 40 which is supportingly connected with said shoe by means of a transverse pivotal pin 41, extending through an ear 42 depending from said support frame and through lugs 43, 43 extending upwardly from said shoe and extending along opposite sides of said ear.

The bearing member 30 is journaled on a transverse frame 44. Said frame has longitudinally spaced V-shaped guides 45, 45 projecting laterally from opposite sides thereof, which are adapted to be supportingly engaged with V-shaped engaging faces of support rollers 46, 46, mounted for rotation about vertical axes on a stationary base 47 for the swivel.

The connection from the support frame 34 to the stationary base 47 includes a pair of crossing links 48, 48, pivotally connected at their forward ends between clevis brackets 49, 49 by means of pivotal pins 50, 50 extending through said clevises and the forward ends of said links. Said clevises project rearwardly from said support frame 34, and are spaced laterally from opposite sides of the longitudinal center thereof. The opposite ends of said cross links are pivotally connected to clevis brackets 51, 51 by means of pivotal pins 52, 52. Said clevis brackets are mounted on and spaced above the top surface of the stationary base 47 and project forwardly therefrom. Said crossing links thus serve to control the path of movement of said support frame and the shoe 40, so said support frame and shoe will move in the path of movement of the reciprocating trough 12 about the spaced vertical axes of the bearings 29 and 30, as has been clearly shown and described in Patent No. 2,304,300, which issued December 8, 1942, to Clarence H. Brown.

Referring now in particular to the means for centering the base 47 with respect to the stroke of the conveyer, to insure that the rollers 46, 46 and 35, 35 will supportingly engage their respective guide tracks during the entire forward and return strokes of the conveyer in all positions of the reciprocating trough 12 with respect to said base 47, said centering mechanism operates on principles similar to those disclosed in Patent No. 2,280,043, which issued to Loy D. Hagenbook April 14, 1942, and includes a member 53 secured to the connecting trough 27, as by cap screws 54, 54, and depending therefrom. Said member is provided with a pair of spaced apart inwardly extending stops 55, 55, at its opposite ends, which are adapted to engage opposite faces of a centering member 56, each of which faces serves as a stop for one of said stops 55. Said last mentioned centering member is slidably mounted on the base 47 in a transverse rectilinear guide 57, for movement into and out of registry with the stops 55, 55. The distance between said stops 55, 55 is equal to the length of stroke of the conveyer plus the distance between opposite engaging faces of the centering member 56.

When initially setting up the swivel 10, the connecting trough 27 is first connected to the trough 11. The shaker conveyer trough line is then reciprocably driven for a few forward and return strokes until the stops 55, 55, engaging opposite faces of the centering member 56, moves the base 47 along the ground to a point where said centering member 56 is midway between the stops 55, 55 at the central part of the stroke of the conveyer. At this point said base is secured in a stationary position on the ground by means of jacks 58, 58 adapted to be interposed between said base and the mine roof (see Figure 5).

One of the jacks 58 is adapted to be set on a hinged member 59 pivotally connected at one of its ends to said base for movement about an axis extending longitudinally of the conveyer. The connection between said hinged member and base includes a longitudinal pin 60, which extends through upwardly and rearwardly projecting ears 61, 61 of said hinged member, and through a lug 62 projecting upwardly from one side of said base and interleaved by said ears. The opposite end of said hinged member has a lug 63 projecting upwardly therefrom, to which are pivotally connected a pair of longitudinally spaced links 64, 64. The opposite ends of said links are pivotally connected to one end of a link 65 extending transversely along the upper surface of the base 47 and guided therein for slidable movement thereacross. Said link is herein shown as having the centering member secured to its upper surface and as projecting upwardly therefrom. A spring 66 is interposed between the inner side of said centering member and an end wall 67 of the guide 57, to urge said centering member in a position to be engaged with the spaced stops 55, 55.

When the swivel is connected to the shaker conveyer trough line and before the jacks 58, 58 are set between the mine roof and the base 47, to secure said base to the ground, the spring 66 will urge the centering member 56 in position to center said base with respect to the stroke of the conveyer. As soon, however, as one of the jacks 58 is set on the hinged member 59 to hold said base stationary on the ground, said hinged member will be pivoted downwardly into engagement with said base. This will hold said centering member out of registry with the stops 55, 55 as is clearly illustrated in Figure 5. In case both jacks 58, or the jack 58 depressing the hinged member 57, becomes loose, the centering member 56 will again be in position to be engaged by the stops 55, 55 to center said base with respect to the stroke of the conveyer and to prevent the rollers 46, 46 and 35, 35 from riding off of their respective guide tracks.

A yieldable stop 69 is provided to act as a safety device, to prevent the base 47 from being moved to a position to cause the rollers 46, 46 and 35, 35 to run out of their respective guide tracks in cases where the right-hand jack only might slip, or to prevent said rollers from running out of their respective guide tracks where the trough 11 or the entire trough line might become displaced longitudinally and both jacks 52 hold. Said yieldable stop is adapted to be engaged by the rear face of the rear stop 55, and is spaced therefrom a distance sufficient that it is only engaged by said stop 55 in case of longitudinal displacement of the trough line, or in case of slippage of the right-hand jack.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an articulated connection for a shaker conveyer trough line, a base, holding means for securing said base to the ground during operation of the conveyer, a trough mounted on said base for reciprocable movement with respect thereto, and means for centering said base with respect to the stroke of the conveyer when setting up said articulated connection, to prevent said trough from running off of said base during reciprocation of the conveyer including stopping means movable with said conveyer trough, other stopping means on said base and adapted to be engaged by said first mentioned stopping means, for moving said base to a centered position with respect to the stroke of the conveyer by reciprocable movement of the conveyer, and means engaged by one of said holding means, for automatically moving one of said stopping means out of registry with the other, when said base is secured in a stationary position on the ground by said holding means.

2. In an articulated connection for a shaker conveyer trough line, a base, holding means for securing said base to the ground during operation of the conveyer, a trough mounted on said base for reciprocable movement with respect thereto, and means for centering said base with respect to the stroke of the conveyer when setting up said articulated connection, to prevent said trough from running off of said base during reciprocation of the conveyer including a stopping means movable with said conveyer trough, other stopping means on said base and adapted to be engaged by said first mentioned stopping means, for moving said base to a centered position with respect to the stroke of the conveyer by reciprocable movement of the conveyer, and means engaged by one of said holding means, for moving one of said stopping means out of registry with the other, when said base is secured in a stationary position on the ground by said holding means, including a member pivotally mounted on said base and adapted to be engaged by one of said holding means, and a linkage connection between said pivoted member and said stopping means on said base, for moving said stopping means out of registry with said other stopping means upon the setting of said holding means on said pivoted member, to hold said base from movement along the ground.

3. In an articulated connection for a shaker conveyer trough line, a base, holding means for securing said base to the ground during operation of the conveyer, a trough mounted on said base for reciprocable movement with respect thereto, and means for centering said base with respect to the stroke of the conveyer when setting up said articulated connection, to prevent said trough from running off of said base during operation of the conveyer including stopping means movable with said conveyer trough, other stopping means on said base and adapted to be engaged by said first mentioned stopping means, for moving said base to a centered position with respect to the stroke of the conveyer by reciprocable movement of the conveyer, means engaged by one of said holding means for moving said stopping means out of registry with each other, when said base is held in position on the ground by said holding means including a member pivotally mounted on said base and adapted to be engaged by one of said holding means, a linkage connection between said member and said stopping means on said base, for moving said stopping means out of registry with each other upon the setting of said holding means on said pivoted member, and yieldable means for moving said stopping means into position for registry with each other upon the release of said holding means associated with said pivoted member.

4. In an articulated connection for a shaker conveyer trough line, a base, holding means for securing said base to the ground during operation of the conveyer, a trough mounted on said base for reciprocable movement with respect thereto, and means for centering said base with respect to the stroke of the conveyer, to prevent said trough from running off of said base during reciprocation of the conveyer including a pair of spaced apart stops reciprocably movable with said trough, a centering member on said base and adapted to be engaged by said stops when initially setting up the conveyer, to properly position said base with respect to the stroke of the conveyer by reciprocable movement of the conveyer, and means operated by one of said holding means, for automatically moving said centering member out of position to register with said stops, when said base is secured in a stationary position on the ground.

5. In an articulated connection for a shaker conveyer trough line, a base, holding means for securing said base to the ground during operation of the conveyer, a trough mounted on said base for reciprocable movement with respect thereto, and means for centering said base with respect to the stroke of the conveyer, to prevent said trough from running off of said base during reciprocation of the conveyer including a pair of spaced apart stops reciprocably movable with said trough, a centering member on said base and adapted to be engaged by said stops when initially setting up the conveyer, to properly position said base with respect to the stroke of the conveyer by reciprocable movement of the conveyer, and means operated by one of said holding means, for moving said centering member out of registry with said stops, when said base is secured in a stationary position on the ground including a member pivotally mounted on said base and adapted to be engaged by one of said holding means, and an operative connection between said member and said centering member for moving said centering member out of registry with said stops, when engaged by said holding means, to hold said base in a stationary position on the ground.

6. In an articulated connection for a shaker conveyer trough line, a base, holding means for securing said base to the ground during operation of the conveyer, a trough mounted on said base for reciprocable movement with respect thereto, and means for centering said base with respect to the stroke of the conveyer, to prevent said trough from running off of said base during reciprocation of the conveyer including a pair of spaced apart stops reciprocably movable with said trough, a centering member on said base and adapted to be engaged by said stops when initially setting up the conveyer, to properly position said base with respect to the stroke of the conveyer by reciprocable movement of the conveyer, and means operated by one of said holding means, for moving said centering member out of registry with said stops, when said base is secured in a stationary position on the ground including a member pivotally mounted on said base and adapted to be engaged by one of said holding means, a link movable transversely of said base and having connection with said centering member, and an operative connection between said pivoted member and said link for moving said centering member out of registry with said stops, when said pivoted member is engaged by said holding means, to hold said base in a stationary position on the ground.

7. In an articulated connection for a shaker conveyer trough line, a base, holding means for securing said base to the ground during operation of the conveyer, a trough mounted on said base for reciprocable movement with respect thereto, and means for centering said base with respect to the stroke of the conveyer when setting up said articulated connection, to prevent said trough from running off of said base including a pair of spaced stops reciprocably movable with said trough, a centering member on said base and adapted to be engaged by said stops, for moving said base to a position where said stops will be spaced equally from said centering member at the central part of the stroke of the conveyer, and means operated by one of said holding means, for moving said centering member out of registry with said stops when said base is held in position on the ground including a member pivotally mounted on said base, a linkage connection between said member and said centering member, for moving said centering member out of position to register with said stops upon the setting of said holding means, and yieldable means for moving said centering member into position to register with said stops, upon the release of said holding means engaged with said pivoted member.

ERNST R. BERGMANN.